United States Patent [19]

Ishikawa

[11] Patent Number: 4,733,064

[45] Date of Patent: Mar. 22, 1988

[54] LIGHT BEAM SCANNER WITH FOCUS-VARYING MECHANISM

[75] Inventor: Hiromi Ishikawa, Kaisei, Japan

[73] Assignee: Fuji Photo Film Co., Ltd., Japan

[21] Appl. No.: 827,868

[22] Filed: Feb. 10, 1986

[30] Foreign Application Priority Data

Feb. 13, 1985 [JP] Japan .................................. 60-26052

[51] Int. Cl.⁴ .............................................. G02B 27/17
[52] U.S. Cl. ..................................... 250/201; 250/236;
350/6.8; 358/293
[58] Field of Search ........................ 250/201, 235, 236;
358/293; 350/6.5, 6.7, 6.8

[56] References Cited

U.S. PATENT DOCUMENTS

| | | | |
|---|---|---|---|
| 4,143,403 | 3/1979 | Ohnishi | 358/293 |
| 4,170,028 | 10/1979 | DeBenedictis et al. | 250/236 |
| 4,204,233 | 5/1980 | Swager | 358/293 |
| 4,205,348 | 5/1980 | DeBenedictis et al. | 250/236 |
| 4,400,740 | 8/1983 | Traino et al. | 358/293 |
| 4,404,596 | 9/1983 | Juergensen et al. | 358/293 |
| 4,587,531 | 5/1986 | Dangler | 358/293 |
| 4,613,877 | 9/1986 | Spencer et al. | 358/293 |
| 4,622,593 | 11/1986 | Curry | 250/235 |

Primary Examiner—Edward P. Westin
Assistant Examiner—Charles Wieland
Attorney, Agent, or Firm—Gerald J. Ferguson, Jr.; Michael P. Hoffman; Michael J. Foycik, Jr.

[57] ABSTRACT

A light beam scanner includes a focus-varying mechanism disposed in a light beam path between a light beam source and a rotating polygonal mirror for adjusting focus position of a light beam as it falls on the rotating polygonal mirror, and a control circuit arrangement for controlling the focus-varying mechanism in synchronism with rotation of the rotating polygonal mirror so that the light beam can fall on the rotating polygonal mirror as a correct linear image at all times for thereby focusing the light beam as a spot image on the image-carrying surface being scanned.

4 Claims, 5 Drawing Figures

LIGHT BEAM SCANNER WITH FOCUS-VARYING MECHANISM

BACKGROUND OF THE INVENTION

1. Field of the Invention

The present invention relates to a light beam scanner for deflecting a light beam to scan an image-carrying surface, and more particularly to a light beam scanner capable of scanning such an image-carrying surface highly accurately with a scanning light beam free of scanning pitch variations.

2. Description of the Prior Art

Various systems have been developed in recent years for reading and/or recording images with light beams. In such a system, the light beam emitted from a light beam source is reflected and, at the same time, deflected by a light beam deflector such as a rotating polygonal mirror to scan an image-carrying surface (main scanning) which is being fed at a constant speed (auxiliary scanning) in a direction normal to the direction in which the light beam is deflected. The light beam deflectors in the conventional light beam scanners are however susceptible to axial displacements with the result that the scanning light beam as deflected by the light beam deflector for scanning the image-carrying surface is liable to be distorted in the auxiliary scanning direction. Where the light beam deflector comprises a rotating polygonal mirror, it would be technically difficult to make the light reflecting surfaces of the mirror completely parallel to the axis of rotation of the mirror, and the scanning beam pitches are rendered different by such mirror surface irregularities. There have been proposed a variety of scanning arrangements which employ an anamorphic optical system between the light beam deflector and the image-carrying surface to be scanned in order to compensate for such mirror surface irregularities.

One example of the proposed scanning systems will be described with reference to FIGS. 3 and 4 of the accompanying drawings. A laser light beam 102 emitted from a laser beam source 101 is adjusted by a beam expander 103 into a light beam of an appropriate beam diameter, which then passes through a cylindrical lens 104 and falls on a light beam deflector 105 in the form of a rotating polygonal mirror as a linear image perpendicular to the axis of rotation thereof. The light beam 102 is reflected and deflected by the rotating polygonal mirror 105 when it rotates in the direction of the arrow m, and travels along a light beam path, which is viewed in a direction parallel to the axis of the rotating polygonal mirror 105 in FIG. 3 and in a direction normal to the axis of the rotating polygonal mirror 105 in FIG. 4.

As illustrated in FIG. 3, the light beam 102 reflected and deflected by the rotating polygonal mirror 105 impinges as a parallel beam upon a spherical lens 107 such as an fθ lens positioned on the light beam path. After having passed through the spherical lens 107, the light beam 102 converges on an image-carrying surface 108 spaced from the spherical lens 107 by the focal length $f_{107}$ thereof. The image-carrying surface 108 is scanned in the direction of the arrow A in an area between $a_1$ and $a_2$ (main scanning) when the rotating polygonal mirror 105 rotates in the direction of the arrow m. Another cylindrical lens 106 is disposed between the spherical lens 107 and the rotating polygonal mirror 105 and extends longitudinally in the direction in which the main scanning takes place. The cylindrical lens 106 is spaced from the rotating polygonal mirror 105 by its own focal length $f_{106}$. The cylindrical lens 106 serves to refract the light beam 102 only in a direction (auxiliary scanning direction) normal to the main scanning direction. The light beam 102 appears in FIG. 3 to pass simply through the cylindrical lens 106. The spherical lens 107 and the cylindrical lens 106 jointly constitute an anamorphic optical system. The spherical lens 107 is shown to be a so-called scanning lens. Instead of the spherical lens 107, an axially symmetric aspherical lens may be employed as such a scanning lens.

The rotating polygonal mirror 105 is apt to suffer reflecting surface irregularities as described above. FIG. 4 shows a system for compensating for such mirror surface irregularities through the anamorphic optical system.

The light beam 102 reflected by the rotating polygonal mirror 105 falls on the cylindrical lens 106, which converts the light beam 102 into a parallel beam because the cylindrical lens 106 is spaced from the rotating polygonal mirror 105 by its own focal length $f_{106}$. The parallel light beam 102 then travels through the spherical lens 107 and converges on the image-carrying surface 108 that is spaced from the spherical lens 107 by the focal length $f_{107}$ thereof. In the absence of reflecting surface irregularities, i.e., if the mirror surfaces are parallel to the axis of rotation of the mirror 105, the light beam 102 goes through the light beam path indicated by the solid lines. If, however, a reflecting surface suffers an irregularity, e.g., a reflecting surface 105a is displaced to a position 105a', then the light beam path is also displaced to a position indicated by the dot-and-dash lines. With the illustrated anamorphic optical system, the light beam traveling along the light beam path indicated by the solid lines and the light beam traveling along the light beam path indicated by the dot-and-dash lines originate from the same point on the reflecting surface 105a, and are converted by the cylindrical lens 106 equally into parallel beams which fall on the spherical lens 107. Therefore, the light beam indicated by the solid lines and the light beam indicated by the dot-and-dash lines converge on the image-carrying surface 108 at the same point $a_3$. As a result, deviation of the light beam path in the vertical direction in FIG. 4 arising from a reflecting mirror surface irregularity, for example, can be compensated for.

The rotating polygonal mirror is however disadvantageous in that as the mirror rotates, the reflecting surfaces thereof are successively moved around the axis of the mirror into and out of the position facing the cylindrical lens 106, thereby causing the light beam coming from a fixed direction to be reflected from different positions on each of the reflecting surfaces. This is undesirable since the length of the light beam path is varied, preventing the light beam from converging on the image-carrying surface at all times.

The above problem will be described in greater detail with reference to FIG. 5. It is assumed that the light beam 102 falls on the rotating polygonal mirror 105 in a constant direction, and the image-carrying surface is scanned by the light beam in the main scanning direction A. As the rotating polygonal mirror 105 rotates in the direction of the arrow m, the length of the light beam path from the light beam source up to the rotating polygonal mirror 105 is continuously varied as is apparent from comparison in FIG. 5 between the solid-line position of the rotating polygonal mirror 105 and the dot-and-dash-line position of the same. Therefore, even if the light beam 102 is reflected as a circular beam spot by a beam reflecting position when the rotating polygonal mirror 105 is in the solid-line position, the light beam 102 will be reflected as an elliptical beam spot from a different beam reflecting position when the rotating polygonal mirror 105 is in the dot-and-dash-line position. Furthermore, the beam reflecting position on the rotating polygonal mirror 105 in the solid-line position and the beam reflecting position on the rotating polygonal mirror 105 in the dot-and-dash-line position are spaced from the image-carrying surface by different distances, the difference between them being indicated by S. In case the beam reflecting position of the rotating polygonal mirror 105 and the image-carrying surface being scanned are to be in a conjugate relationship when the rotating polygonal mirror 105 is in the solid-line position, no such conjugate relationship is achieved as long as the rotating polygonal mirror 105 is not in the solid-line position. The light beam reflected from any beam reflecting position which is not in a conjugate relationship to the image-carrying surface does not converge completely on the image-carrying surface and hence is out of focus thereon. The foregoing effect which the continuous angular movement of the reflecting surfaces of the mirror 105 has on the light beam position on the reflecting surfaces and the light beam focus on the image-carrying surface can be reduced to a certain extent by positioning the cylindrical lens 106 between the spherical lens 107 and the image-carrying surface 108 as closely to the image-carrying surface 108 as possible. However, such an arrangement not only fails to solve the above problem completely, but also is practically infeasible inasmuch as it requires an elongate and hence expensive cylindrical lens having a length close to the width or interval to be scanned.

SUMMARY OF THE INVENTION

In view of the aforesaid difficulties of the conventional light beam scanners, it is an object of the present invention to provide a light beam scanner employing a rotating polygonal mirror as a light beam deflector and an anamorphic optical system for compensating for scanning pitch variations, the light beam scanner being capable of sharply focusing a light beam at all times on an image-carrying surface being scanned even if the light beam is reflected from different beam reflecting positions as the reflecting mirror surfaces are successively moved about the axis of the rotating polygonal mirror upon continuous rotation thereof.

A light beam scanner according to the present invention includes a focus-varying mechanism disposed in a light beam path between a light beam source and a rotating polygonal mirror for adjusting the focus position of a light beam as it falls on the rotating polygonal mirror, and control means for controlling the focus-varying mechanism in synchronism with rotation of the rotating polygonal mirror, whereby the light beam can fall on the rotating polygonal mirror as a correct linear image at all times.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
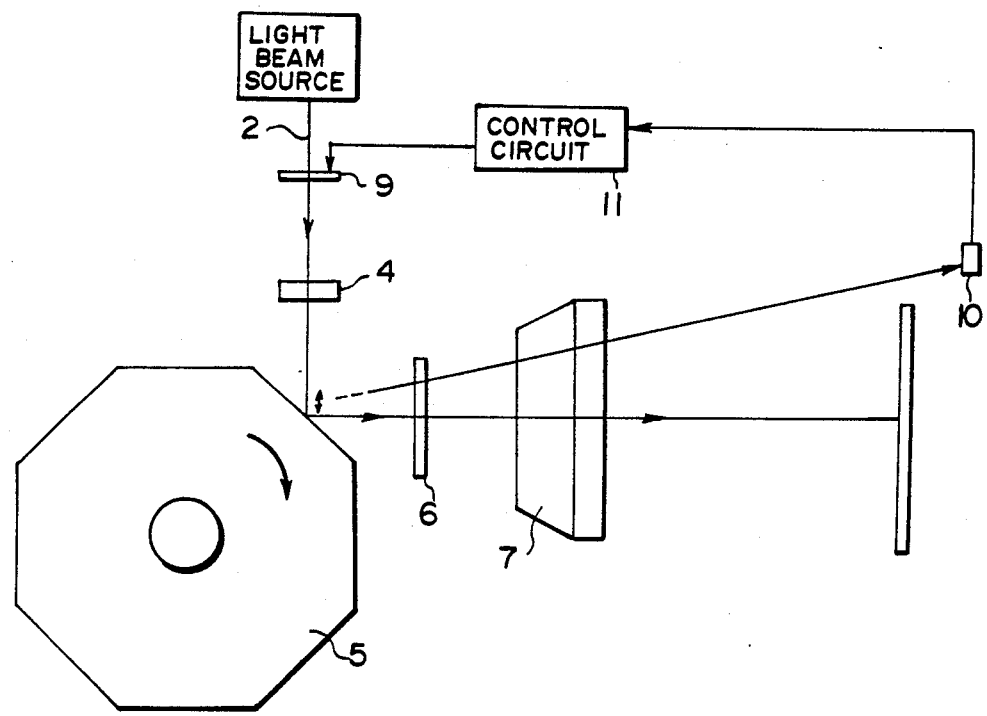
FIG. 1 is a schematic view of a light beam scanner according to the present invention, the light beam scanner being seen in a direction parallel to the axis of rotation of a rotating polygonal mirror.

As shown in FIG. 1, a light beam 2 emitted from a light beam source and adjusted into an appropriate beam diameter passes through a focus-varying mechanism 9 disposed in the light beam path and a cylindrical lens 4 disposed in the light beam path, and then falls on a rotating polygonal mirror 5 as a linear image normal to the axis of rotation of the rotating polygonal mirror 5 as it rotates. The light beam 2 is reflected and deflected by the rotating polygonal mirror 5. The light beam 2 impinges upon the rotating polygonal mirror 5 in such a direction that when the rotating polygonal mirror 5 is in a central position in its one deflecting sweep, the direction in which the light beam 2 is reflected from the rotating polygonal mirror 5 is perpendicular to the direction of incidence of the light beam 2. An anamorphic optical system comprises a cylindrical lens 6 and an fθ lens 7 in the form of a spherical lens which are located in the path of the light beam reflected and deflected by the rotating polygonal mirror 5. The anamorphic optical system has its optical axis normal to the direction of incidence of the light beam 2 on the rotating polygonal mirror 5. Therefore, the beam reflecting position on the rotating polygonal mirror 5 and an image-carrying surface to be scanned by the light beam 2 are always in conjugate relationship to each other even if the reflecting surfaces of the rotating polygonal mirror 5 are successively moved around the axis of rotation of the mirror 5 upon continuous rotation thereof. As long as the light beam 2 is focused as a linear image on the reflecting mirrors, the reflected and deflected light beam is caused to converge on the image-carrying surface at all times in properly focused condition. As a result, the scanning position on the image-carrying surface can be corrected automatically even if the rotating polygonal mirror 5 is subjected to reflecting surface irregularities or axial displacements.

The light beam 2 incident on the rotating polygonal mirror 5 can always be controlled to converge on the reflecting surfaces while they are being successively moved around the axis of the rotating polygonal mirror 5 when it rotates. The focus-varying mechanism 9 disposed in the light beam path leading from the light beam source to the rotating polygonal mirror 5 is driven in synchronism with the rotation of the rotating polygonal mirror 5 for adjusting the focus position of the light beam 2 on the mirror 5. More specifically, a scanning-start detector 10 is positioned in a light beam path which is followed by the light beam 2 and reflected and deflected by the rotating polygonal mirror 5 when one scanning cycle is initiated. Each time the light beam 2 hits the scanning-start detector 10, the scanning-start detector 10 generates a signal and applies it to a control circuit 11 which then controls the focus-varying mechanism 9 in synchronism with the rotation of the rotating polygonal mirror 5.

Figure 2:
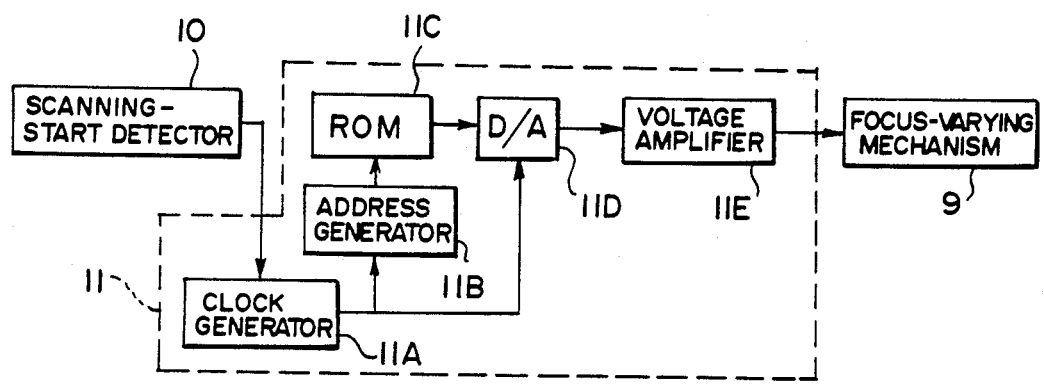
FIG. 2 is a block diagram of a control circuit in the light beam scanner.
Figure 3:
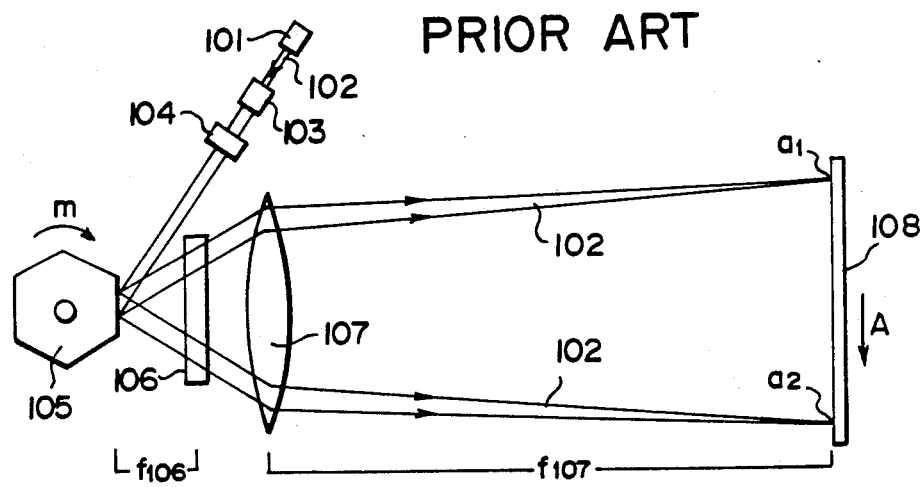
FIG. 3 is a schematic view of a conventional light beam scanner with a light beam path being seen in a direction parallel to the axis of rotation of a rotating polygonal mirror.
Figure 4:
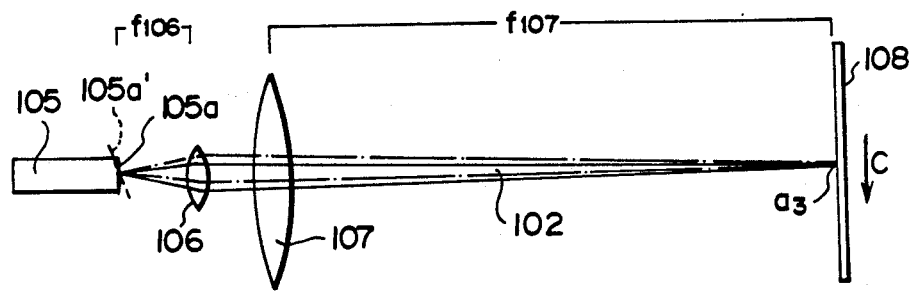
FIG. 4 is a schematic view of the conventional light beam scanner with the light beam path being seen in a direction normal to the axis of rotation of the rotating polygonal mirror.
Figure 5:
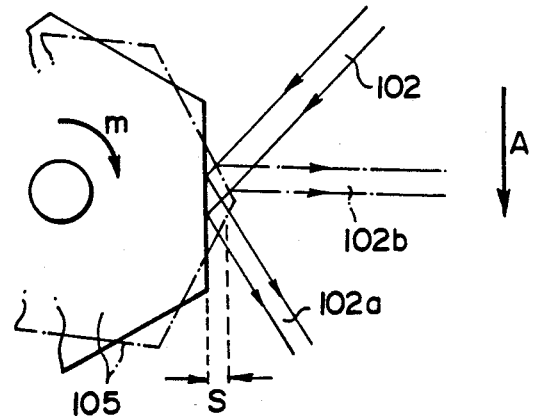
FIG. 5 is a schematic view explaining the manner in which a light beam reflecting position varies dependent on rotation of the rotating polygonal mirror in the conventional light beam scanner.

The control circuit 11 is illustrated in detail in FIG. 2. The signal produced by the scanning-start detector 10 is applied to a clock generator 11A in the control circuit 11. The clock generator 11A is responsive to the signal from the scanning-start detector 10 for generating a pulse signal at prescribed intervals. The pulse signal is applied to an address generator 11B which generates an address signal fed to a read-only memory (ROM) 11C. The ROM 11C then issues a stored signal at constant intervals in response to the address signal. The signal from the ROM 11C is converted by a digital-to-analog (D/A) converter 11D into an analog signal representing a small voltage. The D/A converter 11D is driven by the clock generator 11A in synchronism with reception of the signal from the ROM 11C. The small voltage from the D/A converter 11D is amplified by a voltage amplifier 11E to drive the focus-varying mechanism 9.

The focus-varying mechanism 9 which is controlled by control means comprising the scanning-start detector 10 and the control circuit 11 may be of various arrangements. For example, it may comprise a plate-like electro-optic crystal bearing a multiplicity of electrodes on its surface, the electro-optic crystal being capable of changing its refractive index in response to an electric field distribution given by different voltages applied to the electrodes. The focus-varying mechanism 9 may also comprise a sheet of glass, a piezoelectric bimorph, and a liquid of a high refractive index retained between the glass sheet and the piezoelectric bimorph, the thickness of the entire assembly being variable in response to the electric field applied. A variable-shape mirror may be employed which comprises a piezoelectric bimorph having a deformable mirror surface. Alternatively, the cylindrical lens 4 may be directly moved by a linear motor or a piezoelectric element. The direction of incidence of the light beam 2 on the rotating polygonal mirror 5 may not necessarily be normal to the optical axis of the cylindrical lens 6 and the fθ lens 7. Instead, the light beam 2 may be caused by the focus-varying mechanism 9 to converge in the beam reflecting position on the rotating polygonal mirror 5, and the beam reflecting position and the image-carrying surface may be brought into a conjugate relationship by the design of the fθ lens 7, etc. The cylindrical lens 6 may be positioned more closely than the spherical lens 7 to the image-carrying surface.

The anamorphic optical system in the illustrated embodiment comprises a combination of spherical and cylindrical lenses. However, the anamorphic optical system that can be incorporated in the light beam scanner of the invention is not limited to the illustrated arrangement, but may be any optical system capable of focusing a light beam, which has impinged upon the rotating polygonal mirror as a linear image normal to the axis of rotation thereof, as a spot image focused in a prescribed position on the image-carrying surface, so that the optical system can serve both as a scanning lens and to compensate for scanning pitch irregularities.

Examples of anamorphic optical systems, other than the combination of spherical and cylindrical lenses, are as follows:

(i) The combination of an axially symmetric aspherical lens and a cylindrical lens;

(ii) The combination of a spherical lens or an axially symmetric aspherical lens and a toric lens;

(iii) The combination of a spherical lens or an axially symmetric aspherical lens and a cylindrical mirror;

(iv) The combination of a spherical lens or an axially symmetric aspherical lens and a toric mirror;

(v) A toric lens whose opposite surfaces are toric surfaces;

(vi) The combination of a cylindrical lens and a toric lens;

(vii) The combination of a spherical lens or an axially symmetric aspherical lens, a cylindrical mirror, and a toric lens; and (viii) The combination of two cylindrical lenses with their optical axes perpendicular to each other.

According to the present invention, as described above in detail, a light beam scanner includes a focus-varying mechanism which can be driven in synchronism with a rotating polygonal mirror for enabling a light beam to converge at all times on an image-carrying surface being scanned even if the light beam is reflected by the rotating polygonal mirror at different beam reflecting positions as the reflecting surfaces are successively moved around the axis of the rotating polygonal mirror upon rotation thereof. Therefore, the light beam is prevented from being thrown out of focus on the image-carrying surface in certain scanned positions, whereas reflecting surface irregularities and axial displacements of the rotating polygonal mirror can be compensated for highly accurately by the anamorphic optical system.

Although a certain preferred embodiment has been shown and described, it should be understood that many changes and modifications may be made therein without departing from the scope of the appended claims.

I claim:

1. A light beam scanner for scanning a surface in a main scanning direction with a light beam emitted from a light beam source while said surface is being continuously fed in an auxiliary scanning direction at a constant speed, said light beam scanner comprising:

(i) a rotating polygonal mirror for reflecting and deflecting the light beam toward said surface;

(ii) an optical system for focusing the light beam from the light beam source to fall on said rotating polygonal mirror as a linear image normal to the axis of rotation thereof where said linear image moves along each facet of the polygonal mirror;

(iii) a focus-varying mechanism disposed between said light beam source and said rotating polygonal mirror for adjusting the focus position of said light beam as it falls on said rotating polygonal mirror;

(iv) control means for controlling said focus-varying mechanism in synchronism with the rotation of said rotating polygonal mirror to maintain said focused linear image on said rotating polygonal mirror; and (v) an anamorphic optical system disposed in a light beam path following said rotating polygonal mirror for focusing the light beam, which has fallen as a linear image on said rotating polygonal mirror, as a spot image on said surface being scanned.

2. A light beam scanner according to claim 1, wherein said control means comprises a scanning-start detector for detecting the start of each scanning cycle over said surface with the light beam, and a control circuit responsive to a signal from said scanning-start detector for controlling said focus-varying mechanism.

3. A light beam scanner according to claim 2, wherein said control circuit comprises a clock generator responsive to the signal from said scanning-start detector for generating a pulse signal, an address generator for generating an address signal in response to the pulse signal from said clock generator, a read-only memory addressable by said address signal for issuing a stored signal, a digital-to-analog converter for converting the signal from said read-only memory into an analog signal, and an amplifier for amplifying said analog signal and applying the same to said focus-varying mechanism.

4. A light beam scanner according to claim 1, wherein said light beam falls on said rotating polygonal mirror in a direction substantially perpendicular to the direction in which the light beam is reflected by said rotating polygonal mirror when the rotating polygonal mirror is in a central position in each scanning cycle.

* * * * *